United States Patent [19]
Collee et al.

[11] Patent Number: 5,360,074
[45] Date of Patent: Nov. 1, 1994

[54] METHOD AND COMPOSITION FOR PRESERVING CORE SAMPLE INTEGRITY USING AN ENCAPSULATING MATERIAL

[75] Inventors: Pierre E. Collee, Kingwood; William A. Mallow, Helotes, both of Tex.; Steven R. Radford, South Jordan, Utah

[73] Assignee: Baker Hughes, Incorporated, Houston, Tex.

[21] Appl. No.: 51,093

[22] Filed: Apr. 21, 1993

[51] Int. Cl.⁵ .............................................. F21B 25/08
[52] U.S. Cl. ........................................ 175/58; 175/226
[58] Field of Search ....................... 175/20, 58, 59, 60, 175/40, 226, 249

[56] References Cited

U.S. PATENT DOCUMENTS

| | | | |
|---|---|---|---|
| 2,514,585 | 6/1945 | Natland . | |
| 2,537,605 | 8/1947 | Sewell . | |
| 2,880,969 | 4/1959 | Williams | 175/226 |
| 3,064,742 | 11/1962 | Bridwell | 175/226 |
| 3,086,602 | 4/1963 | Henderson | 175/404 |
| 3,112,799 | 12/1963 | Gallus | 175/58 |
| 3,123,158 | 3/1964 | Gallus | 175/226 X |
| 3,207,240 | 9/1965 | Hugel | 175/226 X |
| 3,467,208 | 9/1969 | Kelly | 175/72 |
| 3,521,715 | 7/1970 | Krutein | 175/226 X |
| 3,841,419 | 10/1974 | Russell | 175/40 |
| 4,098,361 | 7/1978 | Lamothe | 175/60 X |
| 4,256,192 | 3/1981 | Aumann | 175/233 |
| 4,272,987 | 6/1981 | Aumann et al. | 73/153 |
| 4,312,414 | 1/1982 | Park | 175/59 |
| 4,321,968 | 3/1982 | Clear | 166/275 |
| 4,449,594 | 5/1984 | Sparks | 175/226 X |
| 4,479,557 | 10/1984 | Park et al. | 175/59 |
| 4,598,777 | 7/1986 | Park et al. | 175/58 |
| 4,716,974 | 1/1988 | Radford et al. | 175/59 |
| 4,848,487 | 7/1989 | Anderson et al. | 175/58 |

FOREIGN PATENT DOCUMENTS 0403437  6/1990  European Pat. Off. .
2152109A  7/1985  United Kingdom .

*Primary Examiner*—George A. Suchfield
*Attorney, Agent, or Firm*—Rosenblatt & Associates

[57] ABSTRACT

The present invention provides a method for maintaining the mechanical integrity and for maximizing the chemical integrity of a core sample during transport from a subterranean formation to the surface. The method involves cutting and encapsulating a core sample with an encapsulating material that increases in viscosity or even solidifies, at temperatures slightly lower than those expected downhole, or relatively early in the transport process. A preferred encapsulating material contains at least one polyglycol or chemically modified polyglycol from the oxyalkylene polymer family. The specific formulation of the encapsulating material differs depending upon the expected downhole conditions. For example, the encapsulating material can include a thickener, a nucleating agent, and a water swellable material or another inert material that is capable of sealing the core sample against water. A preferred nucleating agent would serve both as a heat transfer agent and a crystallization trigger, and therefore would speed up the rate at which the encapsulating material would solidify or increase in viscosity, particularly downhole. The encapsulating material should either solidify or increase in viscosity enough to protect the mechanical integrity and maximize the chemical integrity of the core sample for analysis at the surface. The chemical integrity of the core sample can be further maximized by using the present invention in conjunction with a pressure core barrel.

24 Claims, 1 Drawing Sheet

METHOD AND COMPOSITION FOR PRESERVING CORE SAMPLE INTEGRITY USING AN ENCAPSULATING MATERIAL

FIELD OF THE INVENTION

The present invention relates to a technique for maintaining the mechanical integrity and maximizing the chemical integrity of a downhole core sample which must be brought to the surface in order to analyze a subsurface formation.

BACKGROUND OF THE INVENTION

In order to analyze the amount of oil contained in a particular soil at a particular depth in the proximity of a subterranean well, a core or core sample of the well material typically is extracted and brought to the surface for analysis. If the core sample has retained its mechanical and chemical integrity during the trip from downhole to the surface, then an analysis of the core sample will yield accurate data about the percent of fluid and/or gas contained in the formation. The resulting data then may be used to determine the type(s) of fluid—especially oil—that is contained in the formation.

Unfortunately, it is difficult to maintain the mechanical and/or chemical integrity of the core sample during its journey from downhole to the surface. Downhole, the oil and/or water in the formation may contain dissolved gas which is maintained in solution by the extreme pressure exerted on the fluids when they are in the formation. However, unless a pressure core barrel is used, the pressure on the core when the core is downhole will differ dramatically from the pressure experienced on the core sample as the core sample is brought to the surface.

As the pressure on the core sample decreases during the trip to the surface, the fluids in the core tend to expand, and any gas dissolved in the oil or water contained in the sample will tend to come out of solution. In addition, any "mobile oil," or oil that passes through the core in a manner dependent on the permeability, porosity, and/or volume of fluid contained therein, may drain or bleed out of the core and be lost. If protective measures are not taken, then this sellable gas, mobile oil, and/or some water may be lost during transport of the core to the surface. As a result, the core sample will not accurately represent the composition of the downhole formation.

One means for dealing with the foregoing problem is pressure coring, or transporting the core to the surface while maintaining the downhole pressure on the core. Pressure coring helps to maintain both the mechanical and chemical integrity of the core. However, pressure coring is expensive for a number of reasons, including: the manpower required; the many difficulties that must be overcome to effectively handle the pressurized core; and, the expensive procedures required to analyze the pressurized core once it reaches the surface.

Another technique that has been used in an attempt to maintain core integrity is known as sponge coring. In sponge coring, an absorbent sponge or foam material is disposed about the core so that fluids forced out of the core during depressurization are absorbed by the adjacent sponge layer. However, sponge coring has a number of disadvantages.

Sponge coring typically does not provide accurate data regarding the structure of the formation because of inadequate saturation, and because the wettability of the sponge varies with variations in temperature and pressure. Also, the sponge does not protect the core from the drastic changes in pressure experienced during transport of the core to the surface. Thus, the core geometry or mechanical integrity of the core sample may not be preserved during sponge coring. Also, even though the sponge may absorb some of the gas and/or oil that escapes from the core sample, some of that gas and/or oil also may be lost during transport. Finally, in order for the sponge sleeve to protect the core, the sponge sleeve must be in close contact with the core. Close contact is difficult to achieve in broken or unconsolidated cores. And, because of the high friction coefficient of the sponge close contact between the sponge and the core can result in jamming within the coring tool even where the core is hard and consolidated.

Some improvement in sponge coring has been achieved by at least partially saturating the sponge with a pressurized fluid that (1) prevents drilling mud from caking on the sides of the core, and (2) prevents fluid loss from the core. The pressurized fluid is displaced from the sponge as the core enters the core barrel and compresses the sponge lining. However, "perfect saturation" of the sponge is impossible as a practical matter. Thus, air tends to remain trapped in the sponge and skew the final analysis of the formation. Even if the sponge is presaturated, gas and solution gas expelled from the core sample tends to be lost. Therefore, the sponge does not accurately delineate the gas held in the formation. For these and other reasons, sponge coring, even with presaturation, leaves much to be desired.

Other techniques for maintaining core integrity involve changing the composition of the drilling mud that is used so that the drilling mud does not contaminate the core, resulting in an erroneous analysis of core content. In one such technique, a polymer containing two or more recurring units of two different polymers is incorporated in the drilling fluid in order to minimize variation in theological properties at ambient versus high downhole temperatures. Another technique for changing the composition of the drilling mud is to mix an oil based fluid with an organophilic clay gelation agent to regulate the thixotropic qualities of the drilling mud or packer fluid.

Other techniques for maintaining core integrity involve attempts to remove contaminants from the core before it is depressurized. One such technique is to flush the core before the core is depressurized and to lubricate and/or wash the core as it enters the core barrel. Although such techniques may help to maintain core integrity after flushing, flushing techniques are inherently unreliable because the flushing process alters the original content of the core.

Some have attempted to develop compositions which will envelope the core and prevent any change in core composition until the envelope is removed. In one such technique, an aqueous gel, such as carboxymethylhydroxyethylcellulose (CMHEC), has been mixed with an aqueous brine solution and an alkaline earth metal hydroxide, such as calcium hydroxide, to form a gel which serves as a water diversion agent, a pusher fluid, a fracturing fluid, a drilling mud, or a workover or completion fluid. In another such technique, material with colligative properties, particularly a carbohydrate such as sucrose or starch, and optionally a salt, such as potassium chloride, has been added to the drilling mud to mitigate the osmotic loss of the aqueous phase of the drilling mud. Still others have tried pumping an oleophilic colloid through the drill string so that it contacts and is dispersed in an oleaginous liquid forming gel which tends to plug the formation.

Unfortunately, none of these techniques has been completely successful in maintaining the mechanical and chemical integrity of a core sample during transport from downhole to the surface. Also, many of these techniques either are expensive or difficult, and may be dangerous to perform. A safe, economical, and efficient technique is needed by which the integrity of the core sample can be maintained while it is transported from downhole to the surface.

SUMMARY OF THE INVENTION

The present invention provides a relatively inexpensive method to maintain the mechanical integrity and maximize the chemical integrity of a core sample while the sample is transported from a subterranean formation to the surface. The present method involves cutting a core and surrounding a core sample with an encapsulating material, preferably a gel that is capable of increasing viscosity or even solidifying at temperatures slightly lower than those expected downhole.

The specific formula of the encapsulating material will differ depending upon the expected downhole conditions, particularly the temperature. The encapsulating material can be any suitable viscous material which: (a) does not react with the crude oil present in the formation; (b) does not invade the formation; (c) prevents the transfer of water into or out of the core sample; and (d) encapsulates the core sample and serves as a buffer which maintains the mechanical integrity and maximizes the chemical integrity of the sample while it is transported from downhole to the surface. A preferable encapsulating material contains a polyglycol or a chemically modified polyglycol from the oxyalkylene polymer family, a thickener, such as colloidal silica or clay, a powder which may swell when it contacts water to seal the pores of the core sample, and a nucleating agent, preferably a powdered metal.

During transport to the surface, the change in temperature causes the encapsulating material to increase in viscosity, or even to solidify, to form a protective capsule around the core sample. If the encapsulating material is used in conjunction with a pressure core barrel, it may be possible to maintain complete chemical and mechanical integrity.

DETAILED DESCRIPTION OF A PREFERRED EMBODIMENT

Figure 1:
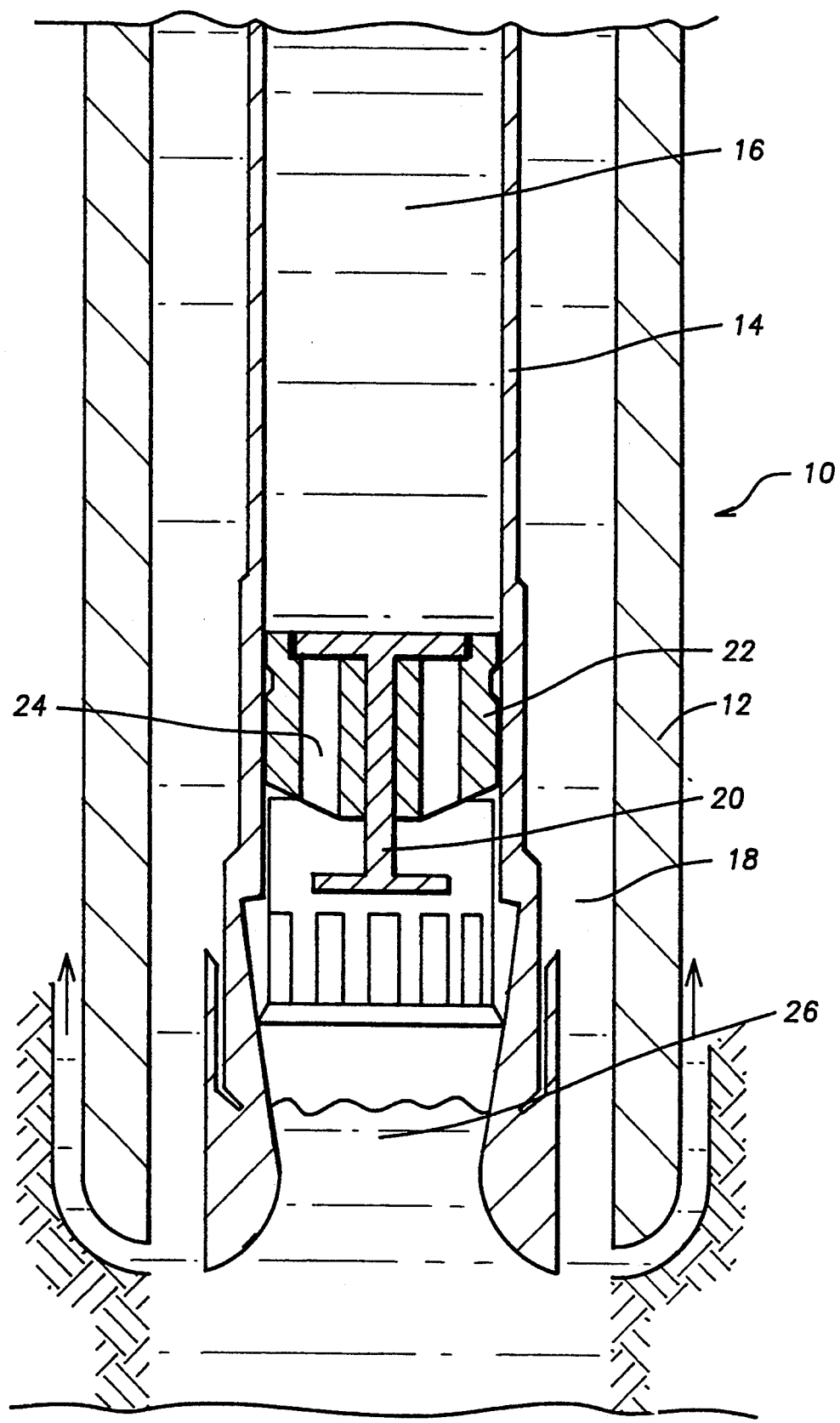
FIG. 1 is a cross sectional view of a segment of a drill bit suitable for use in conjunction with the present invention before encapsulation of the core.

The composition of the encapsulating material of the present invention will vary depending upon the characteristics of the formation to be cored. For example, a highly permeable formation will require a highly viscous material so that the encapsulating material will not invade the formation. In contrast, a tighter formation with very little permeability will not require such a highly viscous encapsulating material because the tendency of the material to invade the formation will be reduced.

One of the most important factors influencing the composition of the encapsulating material will be the expected temperatures downhole and during the trip to the surface. The temperatures typically encountered downhole range between about 37.78°–121.11° C. (100°–250° F.). Thus, the encapsulating material preferably should begin to increase in viscosity or to solidify at temperatures ranging between about 37.78°–65.56° C. (100°–150° F.).

During the trip to the surface, the encapsulating material must reach at least a viscosity that is capable of protecting the integrity of the core sample during transport to the surface. That viscosity must be reached before the core sample begins to lose mechanical and/or chemical integrity. Materials that are useful in the present invention tend to supercool, or to remain liquid, even at temperatures below their normal melting range. Nevertheless, the material must be able to viscosify or even solidify before the integrity of the core is adversely affected. If the expected downhole temperatures are relatively high, then the encapsulating material should be capable of reaching a sufficient viscosity at a relatively high temperature. If the expected downhole temperatures are relatively low, then the encapsulating material should be capable of reaching a suitable viscosity at a relatively low temperature.

Use of the encapsulating material, alone, should maintain substantially complete mechanical integrity of the core sample during transport; however, use of the encapsulating material, alone, may not be sufficient to maintain complete chemical integrity of the core sample. When compared to other available options that do not use a pressure core barrel, use of the encapsulating material of the present invention does maximize the chemical integrity of the core sample. If complete chemical integrity is required, then the present encapsulating material should be used in conjunction with a pressure core barrel. The use of both the encapsulating material and a pressure core barrel will virtually guarantee the chemical integrity of the core sample.

The encapsulating material could be comprised of any number of materials that are capable of increasing in viscosity and/or solidifying under the particular conditions to be experienced downhole. At very low formation temperatures, such materials might even include extremely viscous drilling polymer mud which should solidify during transport and at least protect the mechanical integrity of the core sample.

A preferred encapsulating material for use in the present invention includes at least one derivative from the oxyalkylene polymer family, preferably a polyglycol, a polyethylene glycol, or a chemically modified polyglycol, which may be used alone or in combination with a thickener, such as colloidal silica or clay. Also, it may be advantageous to add a powder which may swell when it contacts water so that it seals the pores of the core sample in the presence of water. For example, a powder such as calcium carbonate or a swelling type of clay, such as sodium bentonite, may be used.

A preferred encapsulating material for use in the present invention is a polyethylene glycol having the following structure:

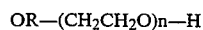

wherein R is selected from the group of a hydrogen or a methyl group. The value "n" represents the number of repeating polyethylene oxide units in the polymer, and can range between about 20–181, depending upon the preferred molecular weight of the encapsulating material.

The preferred molecular weight of the encapsulating material should be determined based on the permeability of the formation to be sampled. The likelihood that the polyethylene glycol derivative will permeate the core sample decreases as the molecular weight of the polyethylene glycol derivative increases. Thus, depending upon the value of "n," the molecular weight of polyethylene glycol derivatives used in the present invention may vary between about 400-20,000 units.

A preferred encapsulating material, which should be useful in encapsulating samples from formations having a wide range of permeabilities, contains a combination of two polyethylene glycol derivatives, such as "CARBOWAX," which may be obtained from any number of suppliers. One derivative is a hard, waxy, white solid in powder or flake form which has a melting or freezing range of 60°-63° C. (140°-145.4° F.), is about 63% water soluble at 20° C. (68° F.), has a viscosity of about 822 centistokes at 98.89° C. (210° F.), and has a molecular weight of about 8000 ("8M," e.g., "CARBOWAX" Polyethylene Glycol 8000). The other derivative is a hard, waxy, white solid in powder or flake form which has a melting or freezing range of 61°-64° C. (141.8°-147.2° F.), is approximately 65% water soluble at 20° C. (68° F.), has a viscosity of 18,650 centistokes at 98.89° C. (210° F.), and has a molecular weight of about 20,000 ("20M," e.g., "CARBOWAX" Polyethylene Glycol 20,000). The ratio of the 8M:20M derivatives, respectively, may vary widely depending upon the characteristics of the formation, with a preferable range being between about 1:1 and 1:10, and a more preferable range being between about 1:1-1:3. For example, if the formation is very fragile, then a lower viscosity will be desired; therefore, the ratio of 8M derivative should be increased.

As discussed above, this preferred combination of polyethylene glycol derivatives may be supplemented with a thickener, such as a colloidal silica or clay, preferably at about 5-10% by weight, more preferably at about 5-6% by weight. It also would be desirable if the encapsulating material contained a sealing agent capable of sealing the pores of the core sample and preventing water from invading the core during coring if water is present. This sealing agent could be the thickening agent, itself, or a separate powder, such as calcium carbonate or another inert material capable of swelling and filling the pores of the core sample. If a separate powder, such as calcium carbonate, is used, then that powder should be present at between about 10-20% by weight, and more preferably between about 10-12% by weight.

Another desirable supplement or additive is a nucleating agent which would increase the heat transfer properties of the encapsulating material and enhance the rate at which the viscosity or solidity of the material would increase, particularly downhole where the temperature is higher. Preferred nucleating agents would include powdered metals, such as copper or aluminum, preferably at about 5-10% by volume (about 25-50% by weight), and more preferably at about 7-8% by volume (about 35-40% by weight). Such nucleating agents preferably should have very fine particle size, most preferably less than 15 microns.

A preferred embodiment of the encapsulating material would contain both a thickener and a nucleating agent which was capable of acting as a heat sink or a heat transfer agent, preferably powdered copper or aluminum. This combination of thickener and powdered metal as additives should have a synergistic effect which would enhance the rate at which the viscosity or solidity of the material would increase. A synergistic effect would arise because the particles of the thickener, themselves, would act as a nucleating agent at lower temperatures. In other words, the powdered metal would (1) act as a heat sink or a heat transfer agent, and therefore enhance the rate at which the viscosity or solidity of the material increased downhole at higher temperatures, and (2) act as a nucleating agent or a triggering agent, "triggering" the encapsulating material to begin crystallizing farther downhole than might be expected otherwise.

While the powdered metal was performing this heat sink/heat transfer function, the core sample would be moving toward the surface. At some point, the encapsulating material would become cool enough that the thickener particles, themselves, would begin to act as nucleating agents. At that point, the rate at which the encapsulating material increased in viscosity or solidity would become much more rapid. This rate increase would be due, at least in part, to the fact that the particles of the thickener are very small, and therefore a vast number of particles would be available to act as "triggers" for crystallization. If the encapsulating material actually solidifies, then it should form a friable, waxy solid which may be removed easily once the core sample reaches the surface.

The invention may be used with any suitable drilling assembly. For example, the assembly is shown in U. S. Pat. No. 4,716,974, incorporated herein by reference, would be suitable. A preferred assembly is shown in FIG. 1, a diagrammatic cross-sectional illustration showing a simplified coring tool to be used with the present invention. The embodiment shown in FIG. 1 is in no way intended to limit the invention. Any number of coring tool designs may be used in conjunction with the theories and claims of the invention.

Referring to FIG. 1, coring tool 10 comprises an outer tube 12 concentrically disposed outside and around an inner tube 14 which holds the encapsulating material 16. Typically, the inner tube 14 is coupled within the drill string to a bearing assembly (not shown) so that the inner tube 14 remains rotationally stationary as the outer tube 12 and the bit rotate. Drilling mud flows through the annular space 18 between the outer diameter of the inner tube 14 and the inner diameter of the outer tube 12. Drilling mud continues to flow downward longitudinally within the annular space 18 of the tool 10, as needed.

A piston 20 having at its upper end a rabbit 22 is located at the bottom of the inner tube 14. The rabbit 22 has longitudinal chambers 24 adapted such that, once an appropriate level of pressure is reached, the encapsulating material 16 flows through said longitudinal chambers 24. As the core 26 enters the lower end of the inner tube 14, the core 26 presses upward against the piston 20, and the resulting pressure is translated to the encapsulating material 16. At some point, the pressure becomes sufficient to force the encapsulating material 16 through the longitudinal chambers 24 in the rabbit 22 to surround the core 26.

Once the desired core sample 26 is obtained, the core sample 26 is isolated using conventional means and the encapsulating material 16 is permitted to completely surround the core sample 26. The encapsulated core sample 26 then is transported to the surface using conventional means. As the ascent to the surface begins, the temperature to which the core sample is exposed will begin to decrease. Once the temperature reaches an expected low, e.g., 48.80° C. (120° F.), the encapsulating material should begin to viscosify or solidify. The encapsulating material should be completely viscosified or solidified before the pressure within the inner tube 14 has changed sufficiently for the core sample 26 to lose its integrity.

EXAMPLE 1

In this first example, a core sample was taken from a formation in the North Sea. The downhole static temperature in the formation was about 85° C. (185° F.) and the downhole circulating temperature was about 71.11° C. (160° F.). The sample removed from the formation was sent to the laboratory and subjected to 1,378,952 Newtons/m$^2$ (200 psi) pressure and to a temperature of about 65.56° C. (150° F.).

An encapsulating material having the following composition was formulated:
 23.8% 8M polyethylene glycol
 ("CARBOWAX" Polyethylene Glycol 8000)
 59.5% 20M polyethylene glycol
 ("CARBOWAX" Polyethylene Glycol 20,000)
 5.5% "WO-30"
 11.1% "MIL CARB"
Note that the ratio of 8M:20M polyethylene glycol was approximately 2:1.

"CARBOWAX" Polyethylene Glycol 8000 was obtained from Union Carbide Corporation, and is 100% polyoxyethylene 8000, a polyethylene glycol derivative having a molecular weight of 7000-9000, CAS #25322-68-3. "CARBOWAX" Polyethylene Glycol 20,000 was obtained from Union Carbide Corporation, and is a 100% polyethylene 20,000, a polyethylene glycol derivative having a molecular weight of 15,000-20,000, CAS #37225-26-6. "WO-30" is a calcium carbonate available from Baker Hughes Inteq in either course or fine form. "MIL CARB" is a sized calcium carbonate which is also available from baker Hughes Inteq. Both "WO-30" and "MIL CARB" are products that may be obtained from Baker Hughes Inteq, P.O. Box 22111, Houston, Tex. 77227.

The following were the physical characteristics of the resulting encapsulating material:

| | |
|---|---|
| Decomposition Point > | 200° C. (392° F.) |
| Melting Point = | 57.77° C. (135° F.) |
| Specific Gravity = | 1.075 at 80/20° C. |
| Vapor Pressure @ 20° C. (68° F.) = | Nil |
| Vapor Density = | >1 |
| Solubility in Water (% by wt) = | 50 at 20° C. (68° F.) |
| Appearance and Odor = | White solid (flake, powder or molten); mild odor. |

The core sample was encapsulated in the foregoing material, and the pressure and temperature on the encapsulated core sample gradually were reduced to ambient. The core sample then was analyzed, and it was determined that the encapsulating material had not invaded the core sample.

EXAMPLE 2

Core samples taken from the same North Sea formation as in Example 1 were exposed to 1,378,952 Newtons/m$^2$ (200 psi) pressure and 65.56° C. (150° F.) and encapsulated in materials having the following formulations:

| | Compositions of Encapusulating Materials Tested | | | | | |
|---|---|---|---|---|---|---|
| Sample | % 20 M | % 8 M | Ratio | % "WO-30" | "Mil-Carb" | Ratio |
| 1 | 55.5 | 27.8 | 2:1 | 5.5 | 11.1 | 1:2 |
| 2 | 41.7 | 41.7 | 1:1 | 5.5 | 11.1 | 1 2 |
| 3 | 0..0 | 83.3 | 0:1 | 5.5 | 11.1 | 1:2 |
| 4 | 59.5 | 23.8 | 1:2.5 | 5.5 | 11.1 | 1:2 |
| 5 | 35.7 | 35.7 | 1:1 | 9.5 | 19.5 | 1:2 |
| 6 | 38.5 | 38.5 | 1:1 | 7.7 | 15.4 | 1:2 |
| 7 | 41.7 | 41.7 | 1:1 | 5.5 | 19.5 | 1:2 |
| 8 | 41.7 | 41.7 | 1:1 | 5.5 | 15.4 | 1:2 |
| 9 | 41.7 | 41.7 | 1:1 | 5.5 | 11.1 | 1:2 |

The melting point of sample 2 was 63.89° C. (147° F.) and the melting point of sample 4 was 57.22° C. (135° F.).

The core sample was encapsulated in the foregoing materials, and the pressure and temperature on the encapsulated core sample were gradually reduced to ambient. The core samples then were analyzed, and it was determined that the encapsulating material had not invaded the core sample.

One of skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for maintaining the mechanical integrity and maximizing the chemical integrity of a core sample during transport from a subterranean formation to the surface comprising:
 cutting a core sample downhole using a coring tool, said core sample having an outer surface;
 encapsulating said core sample, as said core sample enters an inner tube in said coring tool, with an encapsulating material comprising a polyglycol capable of increasing in viscosity in response to a decrease in temperature during transport to a level and at a time sufficient to protect said integrity of said core sample during transport; and
 transporting said encapsulated core sample to said surface.

2. The method of claim 1 wherein said encapsulating material comprises a polyethylene glycol.

3. The method of claim 2 wherein said gel comprises a derivative of polyethylene glycol having a molecular weight of about 8,000; and
 a derivative of polyethylene glycol having a molecular weight of about 20,000.

4. The method of claim 3 wherein said encapsulating material further comprises a particulate sealing agent having a particle size distribution capable of substantially sealing the pores present at said outer surface of said core sample.

5. The method of claim 4 wherein said nucleating agent comprises a powdered metal.

6. The method of claim 2 wherein said core sample is transported to said surface in a pressure core barrel.

7. The method of claim 1 wherein said encapsulating material further comprises a particulate sealing agent having a particle size distribution capable of substantially sealing the pores present at said outer surface of said core sample.

8. The method of claim 7 wherein said nucleating agent comprises a powdered metal.

9. The method of claim 7 wherein said particulate sealing agent comprises calcium carbonate.

10. The method of claim 7 wherein said core sample is transported to said surface in a pressure core barrel.

11. The method of claim 10 wherein said particulate sealing agent comprises calcium carbonate.

12. A method for maintaining the mechanical integrity and maximizing the chemical integrity of a core sample during transport from a subterranean formation to the surface comprising:
cutting a core sample downhole, said core sample having an outer surface;
encapsulating said core sample with an encapsulating material comprising a polyethylene glycol having the following structure:

OR—(CH$_2$CH$_2$O)$_n$—H wherein R is selected from the group consisting of hydrogen and a methyl group and n is within the range of about 20 to about 181.

13. The method of claim 12 wherein said encapsulating material further comprises a particulate sealing agent having a particle size distribution capable of substantially sealing the pores present at said outer surface of said core sample.

14. The method of claim 13 wherein said nucleating agent comprises a powdered metal.

15. A method for maintaining the mechanical integrity and maximizing the chemical integrity of a core sample during transport from a subterranean formation to the surface comprising:
cutting a core sample downhole using a coring tool, said core sample having an outer surface;
encapsulating said core sample, as said core sample enters an inner tube in said coring tool, with an encapsulating material comprising:
a polyglycol glycol capable of increasing in viscosity in response to a decrease in temperature during transport to a level and at a time sufficient to protect said integrity of said core sample during transport;
a particulate sealing agent having a particle size distribution capable of substantially sealing the pores present at said outer surface of said core sample; and
transporting said encapsulated core sample to said surface.

16. The method of claim 15 wherein said nucleating agent comprises a powdered metal.

17. A core sample whose mechanical and chemical integrity has been maintained during transport from a subterranean formation to the surface by a process comprising:
cutting a core sample downhole using a coring tool, said core sample having an outer surface;
encapsulating said core sample, as said core sample enters an inner tube in said coring tool, with an encapsulating material comprising a polyglycol capable of increasing in viscosity in response to a decrease in temperature during transport to a level and at a time sufficient to protect said integrity of said core sample during transport; and
transporting said encapsulated core sample to said surface.

18. The method of claim 17 wherein said encapsulating material further comprises a particulate sealing agent having a particle size distribution capable of substantially sealing the pores present at said outer surface of said core sample.

19. The method of claim 18 wherein said particulate sealing agent comprises calcium carbonate.

20. The method of claim 18 wherein said core sample is transported to said surface in a pressure core barrel.

21. The method of claim 17 wherein said core sample is transported to said surface in a pressure core barrel.

22. A method for maintaining the mechanical integrity and maximizing the chemical integrity of a core sample during transport from a subterranean formation to the surface comprising:
cutting a core sample downhole using a coring tool, said core sample having an outer surface;
encapsulating said core sample, as said core sample enters an inner tube in said coring tool, with an encapsulating material comprising a polyglycol capable of increasing in viscosity in response to a decrease in temperature during transport to a level and at a time sufficient to protect said integrity of said core sample during transport; and
transporting said encapsulated core sample to said surface in a pressure core barrel.

23. The method of claim 22 wherein said encapsulating material further comprises a particulate sealing agent having a particle size distribution capable of substantially sealing the pores present at said outer surface of said core sample.

24. The method of claim 23 wherein said particulate sealing agent comprises calcium carbonate.

* * * * *